(12) United States Patent
Burkland

(10) Patent No.: US 8,447,550 B1
(45) Date of Patent: May 21, 2013

(54) COMPACT FIXED-SOURCE ARRAY TEST STATION FOR CALIBRATION OF A SEMI-ACTIVE LASER (SAL) SEEKER

(75) Inventor: Michael K. Burkland, Tucson, AZ (US)

(73) Assignee: Rayheon Company, Waltham, MA (US)

(*) Notice: Subject to any disclaimer, the term of this patent is extended or adjusted under 35 U.S.C. 154(b) by 0 days.

(21) Appl. No.: 13/479,088

(22) Filed: May 23, 2012

Related U.S. Application Data

(63) Continuation-in-part of application No. 12/947,234, filed on Nov. 16, 2010.

(51) Int. Cl.
*G01C 19/00* (2006.01)

(52) U.S. Cl.
USPC .......................................................... 702/104

(58) Field of Classification Search
USPC .......................................................... 702/104
See application file for complete search history.

(56) References Cited

U.S. PATENT DOCUMENTS

| | | | |
|---|---|---|---|
| 5,457,493 A | * | 10/1995 | Leddy et al. .................. 348/164 |
| 5,781,281 A | | 7/1998 | Miyano |
| 6,742,901 B2 | | 6/2004 | Kimura et al. |

OTHER PUBLICATIONS

Thorlabs, LED1050E, Ultra Bright NIR LED, Specifications and Documentation, Feb. 7, 2007.

* cited by examiner

*Primary Examiner* — Stephen Cherry
(74) *Attorney, Agent, or Firm* — Eric A. Gifford

(57) ABSTRACT

A fixed-source array test station provides a compact cost-effective high-throughput test bed for testing optical sensors that require stimulus at fixed angular positions. An array of fixed collimated sources at different angular positions in the sensor's FOV are positioned on a surface of a focal sphere at the effective focal length of a spherical lens and aligned along respective radial lines to the center of the spherical lens so that each said divergent optical beam is collimated by the spherical lens to form a collimated optical beam that overlaps the entire entrance pupil of the optical seeker. The sources are activated in accordance with an activation profile in order to calibrate or otherwise test the sensor.

20 Claims, 14 Drawing Sheets

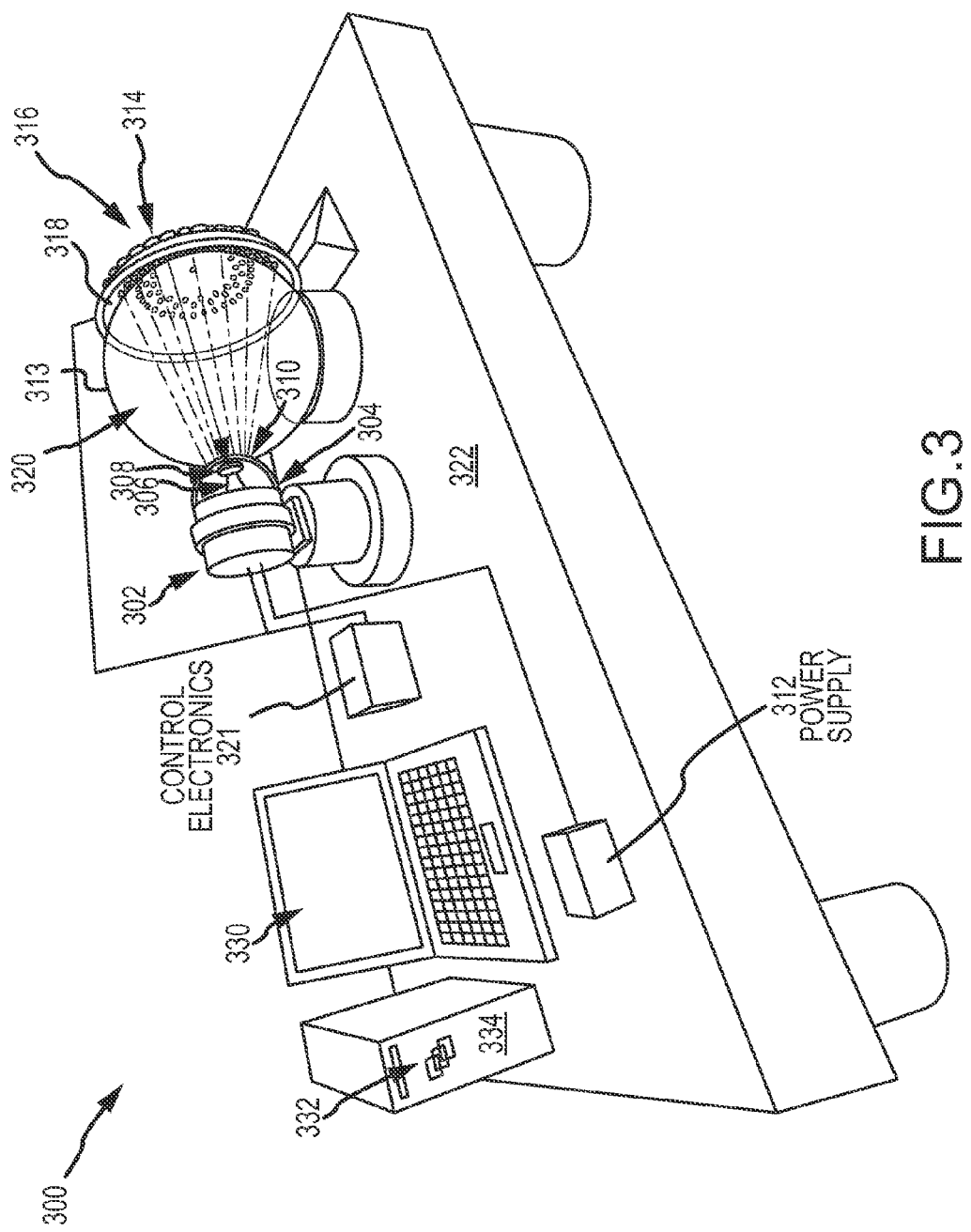

COMPACT FIXED-SOURCE ARRAY TEST STATION FOR CALIBRATION OF A SEMI-ACTIVE LASER (SAL) SEEKER

CROSS-REFERENCE TO RELATED APPLICATIONS

This application claims benefit of priority under 35 U.S.C. 120 as a continuation-in-part application of co-pending U.S. patent application Ser. No. 12/947,234 entitled "Fixed-Source Array Test Station for Calibration of a Semi-Active Laser (SAL) Seeker" filed on Nov. 16, 2010, the entire contents of which are incorporated by reference.

BACKGROUND OF THE INVENTION

1. Field of the Invention

This invention relates to guided projectiles that engage targets by detecting and following laser light scattered from the targets, and more particularly to a test station for calibration of the spatial transfer function (STF) of the semi-active laser (SAL) seeker and other testing, as well as testing other electro-optic (EO) sensors.

2. Description of the Related Art

Laser guided ordinance is commonly used to engage point targets with a high probability of success and minimal collateral damage. Such ordinance includes guided artillery projectiles, guided missiles, and guided bombs, all of which will be referred to herein as "projectiles".

A laser guided projectile's guidance system typically includes a semi-active laser (SAL) seeker, fixed-post or gimbaled, to detect pulsed laser electro-magnetic radiation (EMR) scattered from the intended target and to provide signals indicative of the target bearing and a flight controller that processes the signals to manipulate one or more control surfaces (e.g. fins or canards) to guide the projectile to the target. The SAL seeker includes either a non-imaging or imaging optical system that captures and focuses the scattered laser EMR into a spot onto a segmented non-imaging detector (e.g. a quad-cell detector) or an imaging detector. As the target bearing changes the position of the spot on the detector changes (e.g. a focal plane array). The detector compares the integrated EMR incident on each cell (segment) to calculate a spatial displacement of the centroid of the spot. The effective field-of-view (FOV) is dictated by the central monotonic region of the detector's spatial transfer function (STF) in which the spot is incident on all four cells, which is in turn determined by the spot size. The detector's central monotonic region is commonly referred to as the "linear" region. The seeker maps the spatial displacement $\Delta X$ and $\Delta Y$ along orthogonal axes to Azimuth (Az), Elevation (El) angles in a calibration table to select an angle measurement as an estimate of the bearing to target.

Referring now to FIG. 1, a laser guided projectile 100 may engage a target 190 by detecting and following scattered laser radiation 195 from the target 190. In FIG. 1, the target 190 is represented as a tank, but may be another type of vehicle, ship, boat, or a structure, building or other stationary object. The target 190 may be illuminated with laser radiation 185 from a laser designator 180. The laser designator 180 may be located on the ground, as shown in FIG. 1, or may be located in a vehicle, ship, boat, or aircraft. The laser designator could be located on the projectile itself. This is typically referred to as an active laser seeker. The scattered laser radiation 195 is a portion of the illumination laser radiation 185.

The laser-guided projectile 100 may include a projectile body 115, control surfaces 125, and a guidance system. The guidance system may include a SAL seeker, of which only a transmissive dome 132 is visible in FIG. 1. The guidance system may include a flight control system to control the flight of the laser guided projectile 100 by manipulating one or more control surfaces 125 based on at least one guidance signal from the SAL seeker. In the example of FIG. 1, the control surfaces 125 are shown as canards, but may be fins, wings, ailerons, elevators, spoilers, flaps, air brakes or other controllable devices capable of affecting the flight path of the laser guided projectile 100.

FIG. 2a shows a frontal view of a detector 250 and a focused laser spot 245.

The detector 250 may comprise a "quad-cell" detector including four quadrants or "segments" A, B, C, D. Other detector configurations including multiple segments may be used. Each quadrant may produce a corresponding signal A, B, C, and D in response to the integrated laser power incident upon each quadrant. Guidance signal $\Delta X$ may indicate an imbalance between the laser power incident upon the left (quadrants A and B) and right (quadrants C and D) halves of the detector 250. Guidance signal $\Delta Y$ may indicate an imbalance between the laser power incident upon the top (quadrants A and C) and bottom (quadrants B and D) halves of the detector 250. The terms "left", "right", "top", and "bottom" refer to the detector 250 as shown in FIG. 2a and do not imply any physical orientation of the detector 250 within a projectile 100. When the laser spot 245 is centered on the detector 250, the signals A, B, C, D may be essentially equal and the guidance signals $\Delta X$ and $\Delta Y$ may both be zero or nearly zero.

More particularly, the detector 250 may effectively measure the centroid of the incident EMR on the detector 250. The spatial transfer function (STF) 255 is a ratio of the laser power on the different quadrants of the detector. When laser power in spot 245 is hitting all four quadrants A-D, the guidance system operates in a linear region (or more generally a "monotonic" region) 260 of the transfer function 255. Within the linear region $\Delta X=((A+D)-(B+C))/(A+B+C+D)$ and $\Delta Y=((A+B)-(C+D))/(A+B+C+D)$ where A, B, C and D are integrated laser power incident on the respective cells. The transfer function 255 in the linear region 260 determines via a calibrated look-up table (LUT) the Az, El angles of the guidance system from the target (e.g. target bearing). When laser power is hitting only two quadrants, the guidance system operates outside the linear region, where the transfer function nears +/−1. The guidance system only knows the direction towards the target, but not its true angle.

The SAL seeker is calibrated offline to generate the calibration LUT that maps the measured and calculated $\Delta X$ and $\Delta Y$ to the Az, El angle pairs over a field-of-view (FOV) and with an angular resolution required for a mission. The SAL detector is mounted on a high precision 3-axis stage. A single Q-switched laser and collimator are mounted in a static fixture to direct a pulsed beam to simulate a spot reflected off a target. A controller rotates the SAL sensor on the 3-axis stage to specified locations to detect the stationary target. A computer records the measurements and maps each $\Delta X$, $\Delta Y$ pair to the Az,El pair for each location of the stage to generate the LUT. This test station and methodology is both expensive and slow. Currently, the total cost of a test station is a few to several hundred thousand dollars for the Q-switched laser and focusing optics, the collimator and the 3-axis stage. The cost is driven by the required angular resolution of both the source and rotation of the stage. A typical medium-fidelity calibration may involve 400 measurements. For each measurement, the 3-axis stage must rotate to the specified location and settle, which takes approximately 2.5 seconds. Data acquisition requires another 0.5 seconds to detect a sufficient number of pulses (e.g. 50) at the Q-switched laser's maximum operable PRF (e.g. 100 Hz) for a high SNR measurement. The medium-fidelity calibration of a single SAL seeker requires approximately 20 minutes. A high-fidelity calibration may take up to 50 minutes. Furthermore, as both the FOV and fidelity specifications increase the calibration time will increase. In a manufacturing environment that must calibrate thousands of seekers the time requirement is burdensome and expensive. Their remains a long felt need for a more cost-effect and time-efficient method to calibrate SAL seekers.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a compact test station for calibration of SAL seekers with a high unit throughput. The test station may also be used to calibrate and otherwise test other types of EO sensors.

In an embodiment, a test station for calibrating a semi-active laser (SAL) seeker including a SAL detector comprises a fixture for mounting the SAL seeker. This fixture may be fixed or allow some range of motion to adjust the alignment of the seeker but does not require a 3-axis stage. The seeker has an optical system with an entrance pupil that gathers optical energy over a field of view (FOV) and focuses the optical energy into a spot on the SAL detector. The SAL detector may comprise a segmented non-imaging detector such as the convention quad-cell detector or an imaging detector such as a FPA.

An array of fixed optical sources generates respective temporally pulsed divergent optical beams. A spherical lens having a first side is positioned at a location in front of where the entrance pupil of the seeker would be located. The spherical lens comprises one or more materials each having an index of refraction greater than one and less than or equal to two. The sources are positioned on a surface of a focal sphere at the effective focal length of the spherical lens offset from a second, opposite side of the spherical lens over the entire FOV of the seeker and aligned along respective radial lines to the center of the spherical lens. The spherical lens collimates each divergent optical beam to form a collimated optical beam that overlaps the entire entrance pupil of the seeker. The spherical lens reduces the overall scale of the test station, reducing both the distance from the sources to the entrance pupil of the seeker and reducing the distance between sources to cover the FOV.

A memory stores one or more source activation profiles to perform different tests. The profile may activate the sources one at a time in a phase delayed manner generate a transfer function mapping a spatial displacement $\Delta X$ and $\Delta Y$ in orthogonal axes of a centroid of the spot to azimuth and elevation angles for the source of the spot to "calibrate" the SAL seeker. The profile may activate the sources to "verify" the transfer function. The profile may activate the sources with a two-dimensional video signal to project a video scene onto the SAL seeker to "characterize" the performance of the seeker. A controller responsive to one of the source activation profiles activates the sources to implement the activation profile. A computer that selects the source activation profile for a particular test, retrieves it from memory and provides it to the controller and is responsive to recorded SAL detector data to perform the test.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a diagram of a compact fixed-source array test station using a spherical lens for calibration of a SAL seeker in accordance with the present invention;

DETAILED DESCRIPTION OF THE INVENTION

Figure 1:
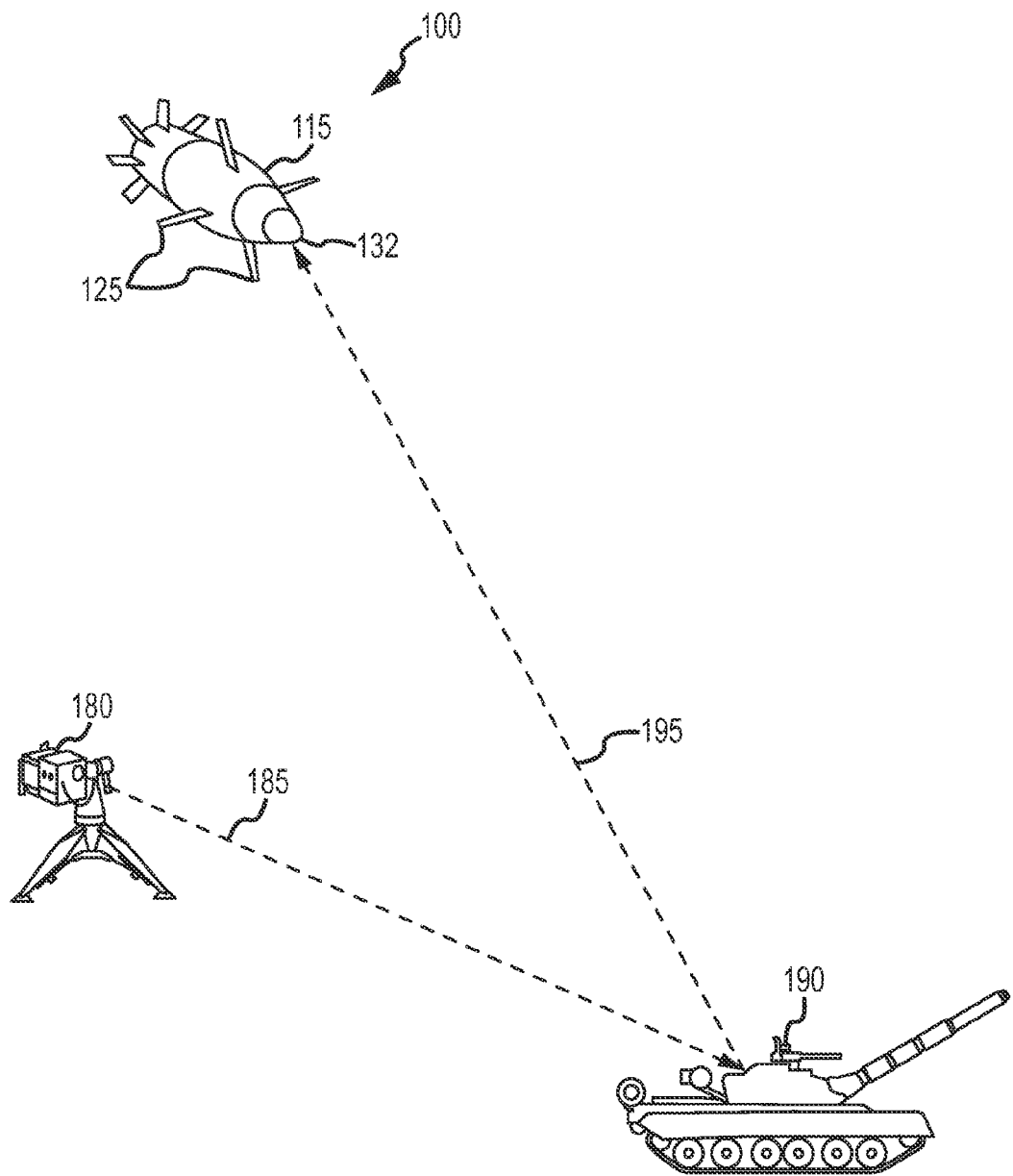
FIG. 1, as described above, is a schematic illustration of a laser-guided projectile engaging a target.

The present invention provides a compact cost-effective high-throughput test station for testing optical sensors that require stimulus at fixed angular positions over a FOV. For example, SAL seekers require stimulus one point at a time over the FOV to perform the STF calibration to generate the transfer function. The station may also be used to perform verification of the transfer function, characterization of seeker performance in response to a video signal stimulus and to calibrate the boresight alignment between the SAL and infrared (IR) sensors in a dual-mode system. A dual-mode sensor system typically consists of co-aligned SAL and long wave infrared (LWIR) sensors, but in general the IR imaging sensor can operate in any desired band. The system may also be used to calibrate the distortion in an IR imaging system and to calibrate the gimbal orientation in a gimbaled system. These tests may require source activation profiles with temporal and/or spatial patterns. The different tests may be conductor for either non-imaging detectors (e.g. quad-cell) or imaging detectors (e.g. a FPA).

The test station includes an array of optical sources at fixed angular positions relative to the center of a spherical lens positioned in front of the entrance pupil of the seeker's optical system. The number of sources depends on the extent of the FOV and required angular fidelity for the test. For typical SAL detectors this may range, for example, from 100 to 1,000 points, hence sources. For this fixed-source array test station to replace the conventional single-source 3-axis stage sensor approach the test station should markedly reduce overall system cost and significantly improve test throughput while maintaining performance, and do so in a compact footprint and physical configuration that is practical. For example, it is desirable that the entire test station fit on an optical bench.

The problems to overcome as apparent to one skilled in the art were many. To reduce system cost below a hundred thousand dollars, the per source cost had to be very low. The combination of the sources and spherical lens had to satisfy the collimation specification at a reasonable distance (e.g. within a few feet) from the sensor. The sources had to be small enough that their placement on the focal sphere offset from the back of the spherical lens at the required angular resolution at that distance did not interfere with each other mechanically or optically (vignetting the beam of the neighboring source). Each source had to be capable of generating its pulsed beam with a sufficiently high pulse repetition frequency (PRF) such that the measurement time for a single point is sufficiently short. The fixed-source array had to be capable of switching from one source to another source very fast to maintain high throughput for point-by-point tests over the FOV such as SAL calibration or to perform more sophisticated activation patterns such as for SAL verification or characterization. Each of these challenges were overcome to provide a compact fixed-source test station that is on the order of a factor of ten less expensive and capable of a throughput that is at least three orders of magnitude (1,000×) faster than the conventional test station for calibrating a SAL STF.

Without loss of generality, an embodiment of a test station configured to calibrate the STF for a SAL seeker having a quad-cell detector will be described. One of ordinary skill in the art will appreciate that the test station may be configured to perform other tests such as verification and characterization of the SAL seeker or may be configured to perform such tests with an imaging detector. The test station may also be configured to perform tests that require stimulus at fixed angular positions over the FOV for any EO sensor.

Figure 2A:
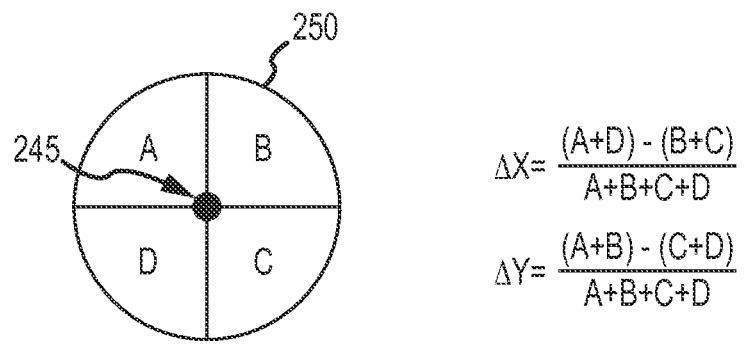
FIGS. 2a and 2b, as described above, are an embodiment of a quad-cell detector and its spatial transfer function.
Figure 2B:
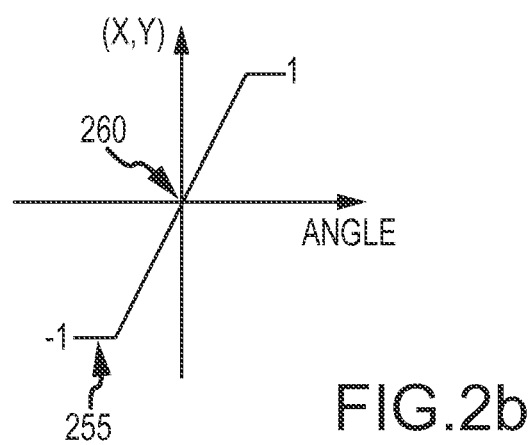
Figure 4:
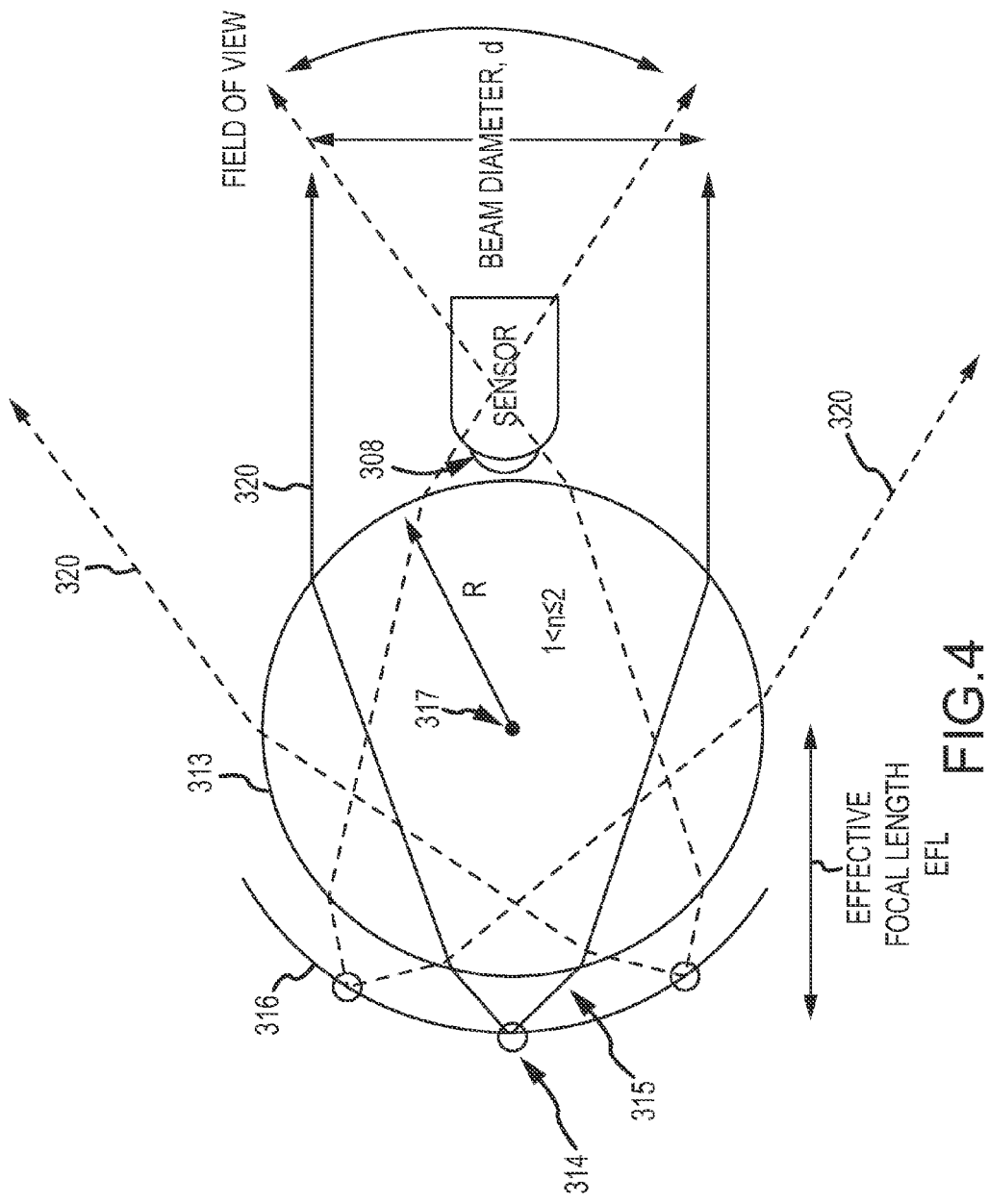
FIG. 4 is an optical diagram of the fixed-source array positioned on a surface of a focal sphere at the back focal length of the spherical lens.

Referring now to FIGS. 3 and 4, a test station 300 includes a sensor fixture 302 for mounting a SAL seeker 304 (the unit under test). Fixture 302 may be a static fixture that provides for no movement, or it may be a fixture that provides some limited range of motion to align the SAL seeker prior to calibration and is then fixed throughout the test procedure or may provide for simple rotation about an axis if used in combination with a linear array of fixed sources. SAL seeker 304 comprises an optical system 306 having an entrance pupil 308 that gathers optical energy over a FOV and focuses the energy into a spot on a SAL detector such as shown in FIGS. 2a and 2b. The optical system may comprise a diffuser that spatially homogenizes the incident light to effectively increase the FOV. The SAL detector is mounted inside the seeker behind the optical system. The optical system may be fixed-post or mounted on a 1- or 2-axis gimbal behind a transmissive dome 310. A power supply 312 provides power for fixture 302 (if needed) and for SAL seeker 304 to drive the SAL detector and possibly a gimbal.

A spherical lens 313 having a first side is positioned at a location directly in front of the entrance pupil 308 of the seeker. The spherical lens comprises one or more materials each having an index of refraction n greater than one and less than or approximately equal to two. The lens may comprise a single unitary material or multiple materials of differing indices of refraction, known as a "gradient index spherical lens" or a "Luneberg lens". The radius R of the spherical lens will typically be between 2.54 cm and 15.24 cm. The effective focal length (EFL) of the lens is greater than its radius R for $1 < n \lessapprox 2$ (e.g. n less than or approximately equal to 2).

An array of fixed optical sources 314 generates respective temporally pulsed divergent optical beams 315. The sources are positioned on a surface of a focal sphere 316 at the effective focal length of the spherical lens offset from a second, opposite side of the spherical lens over the entire FOV of the seeker at different fixed angular positions aligned along respective radial lines to the center 317 of the spherical lens. The surface of the focal sphere 316 is suitably a partial shell 318 that is mounted on and offset from the side, opposite side of the spherical lens. The spherical lens collimates each divergent optical beam 316 to form respective collimated optical beams 320 that each overlap the entire entrance pupil 308 of the seeker.

The spherical lens may introduce a small spherical aberration if the entrance pupil is illuminated towards the edge of the collimated beam. Options are to accept the spherical aberration, to either add a secondary curvature to the base curve of the focal sphere or modify the optics of the optical sources to compensate for the spherical aberration, or to characterize the aberration and compensate the waveform numerically.

The spherical lens reduces the overall scale of the test station, reducing both the distance from the sources to the entrance pupil of the seeker and reducing the distance between sources to cover the FOV. The distance between any source and the entrance pupil is typically less than approximately 61 cm. The distance between any two sources at opposites sides of the FOV is typically less than approximately 15.25 cm. The EFL is typically less than approximately 38 cm. At this scale, the entire test station can be positioned on the top of a typical optical bench 322.

A computer device 330 (e.g. a computer) controls the operation of and processes data from the SAL seeker and selects an activation profile 332 stored in memory 334 and sends the activation profile to control electronics 321 to activate the sources in accordance with the profile. To calibrate the STF for the SAL detector, the sources are activated in a phase delayed manner (mechanically or electronically switched) to measure the spatial displacement of the spot for each individual source. The known angular position (Az, El) of each fixed source is paired with the measured spatial displacement (ΔX, ΔY) to create a table entry for the transfer function in a calibration table. Depending on the pattern of the fixed-source array, measured values may not exist for all table entries. These values may be calculated by interpolating from measured values. The table entries may also be interpolated to provide entries at regular intervals of spatial displacement. To characterize the performance of the SAL seeker, the sources can be sequentially activated in an arbitrary spatial pattern, or can be are activated in combinations to project a two-dimensional video signal onto the SAL detector. The computer records and then evaluates the response of the SAL seeker to different scenes.

Figure 5A:
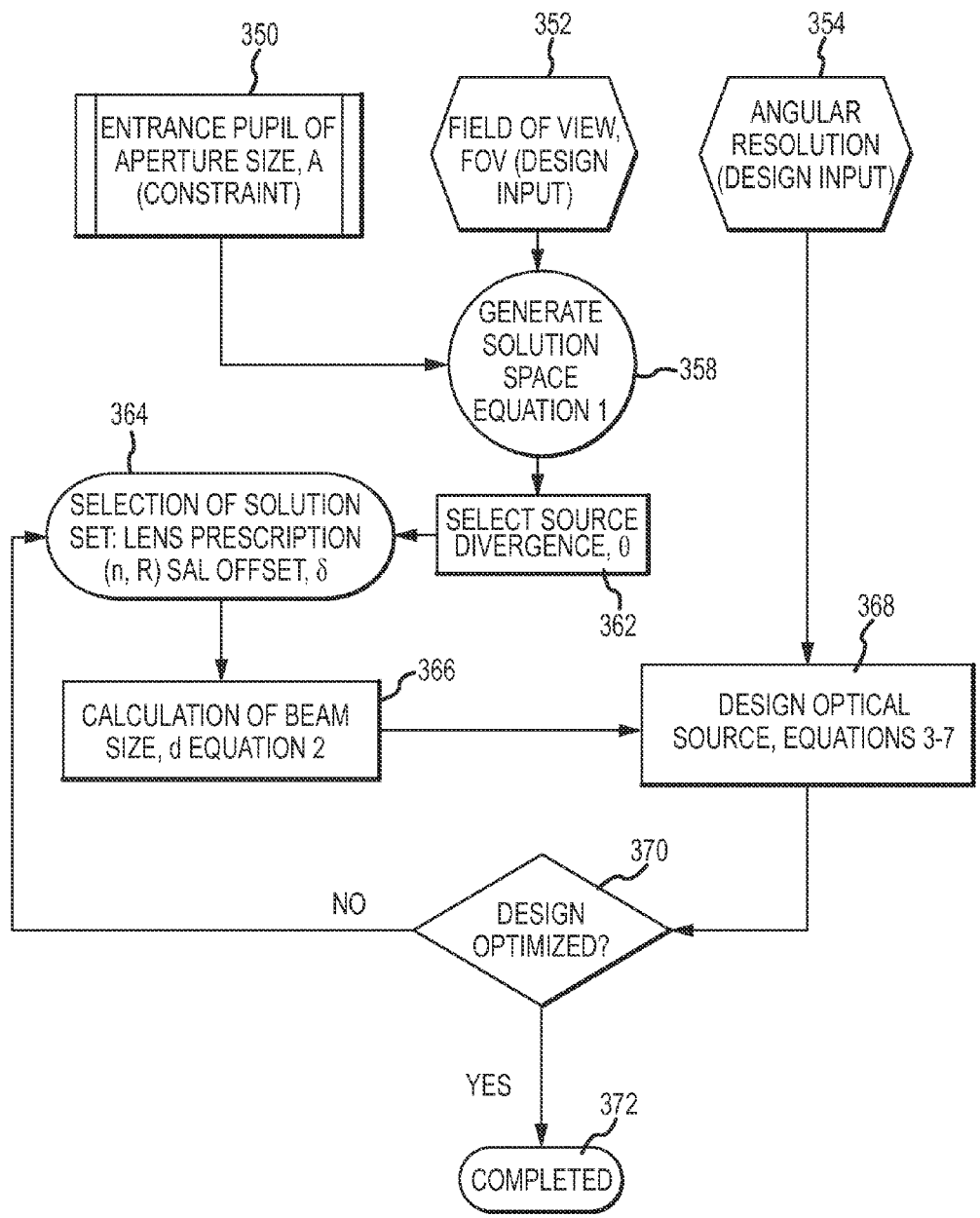
FIGS. 5a-5c are design flow and optical diagrams and a three-dimensional plot of the solution space of an embodiment of the process for designing the compact fixed-source array test station.
Figure 5B:
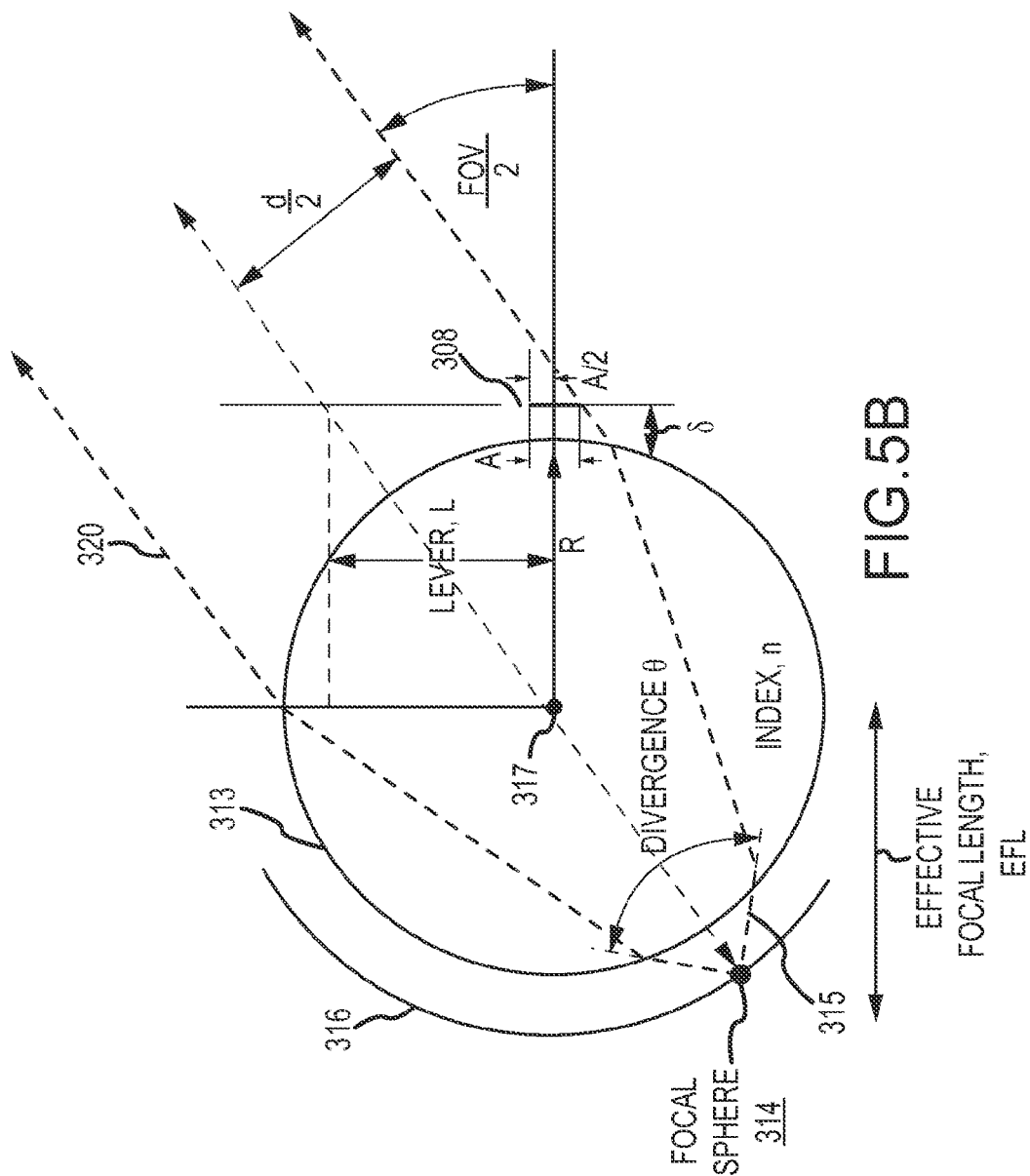
Figure 5C:
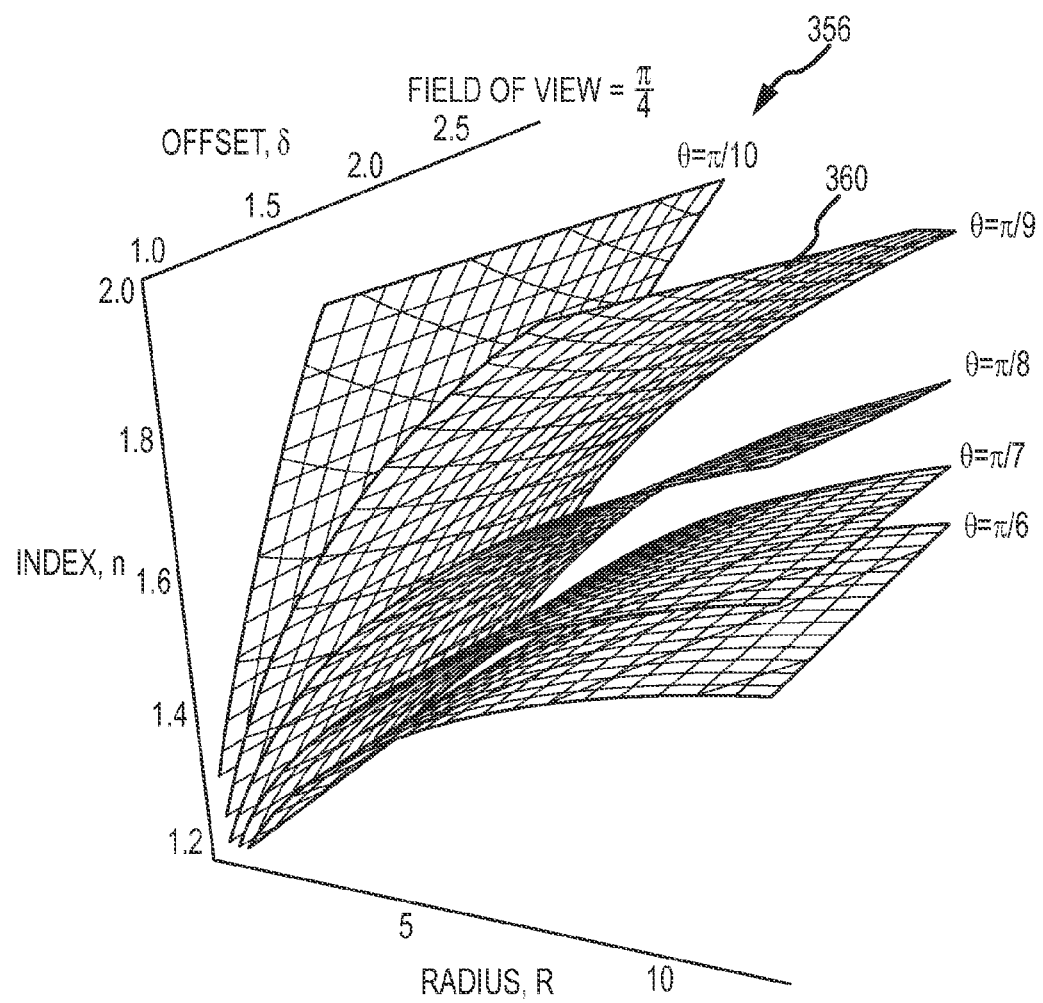

An embodiment for designing the test station is illustrated in FIGS. 5a through 5c. The SAL seeker dictates the aperture size A of the entrance pupil as a constraint. (step 350). The FOV and angular resolution of the FOV by the sources are specified design inputs (steps 352 and 354).

Equation 1 generates a solution space 356 as shown in FIG. 5c (step 358).

$$\theta = \mathrm{ArcTan}\left[\frac{2(n-1)\mathrm{Cos}\left[\mathrm{Tan}\left[\frac{FOV}{2}\right]\right]\left(\frac{A}{2} + (R+\delta)\mathrm{Tan}\left[\frac{FOV}{2}\right]\right)}{nR}\right] \quad (1)$$

where θ is the divergence angle of the optical source, n is the index of refraction, A is the aperture size, R is the radius of the spherical lens and δ is the SAL offset between entrance pupil 308 and the surface of spherical lens 313 as shown in FIG. 5b. Solution space 356 includes three-dimensional surfaces 360 in (n,R,δ) for different divergence angles θ such as that might be available for commercial off-the-shelf sources.

The designer selects a surface 360 corresponding to a particular divergence angle θ (step 362). This selection may be influenced by the divergence angles that are supported by optical sources that satisfy other criteria such as cost or size. The designer selects a specific solution set of the lens prescription (n, R) and the SAL offset δ (step 364). The selection of a specific solution set may be influenced by, for example, the available and expense of a spherical lens with a particular radius R and index of refraction n or by the need to satisfy a minimum SAL offset dictated by the seeker.

The next step is to calculate the diameter d of the collimated beam 320 produced by spherical lens 313 in accordance with equation 2 (step 366).

$$d = 2\cos\left[\text{Tan}\left[\frac{FOV}{2}\right]\right]L, \text{ where, } L = \frac{A}{2} + (R + \delta)\text{Tan}\left[\frac{FOV}{2}\right] \quad (2)$$

where L is the distance measured vertically from the center of entrance pupil 308 of aperture size A to the center of collimated beam 320 for an optical source 314 at the edge of the FOV. The solution set ensures that the diameter d of the collimated beam 320 is such that the collimated beam for any source 314 in the FOV will overlap the entire entrance pupil 308.

The designer designs the optical source 314 in accordance with equations 3-7 (step 368).

$$EFL = \frac{n \times R}{2(n-1)} \quad (3)$$

$$NA = n \sin \theta = n \sin[\text{ArcTan }[(d/2)/EFL]] \quad (4)$$

$$\#\text{Sources} = FOV/\text{Angular Resolution} \quad (5)$$

$$\text{Source Spacing} = EFL \times FOV/\#\text{Sources} \quad (6)$$

$$\text{Source Dimension} \leftarrow \text{Source Spacing} \quad (7)$$

For $1 < n \leq 2$, the EFL is greater than R according to equation 3. This offset is referred to as the back focal length.

The numerical aperture NA of the source determines the amount of light from the source that is coupled into the entrance pupil. The NA is related to the beam width d, which is in turn related back to the divergence angle θ. The requirement for a certain NA can effect the selection of the divergence angle in step 262.

The number of sources (#Sources) is the ratio of the FOV over the angular resolution specified in step 354. The source spacing is the ratio of the FOV to the number sources multiplied by the effective focal length (EFL). The source dimension or "footprint" of the source must be less than or equal to the source spacing in order to position the array of optical sources on the focal sphere to achieve the specified angular resolution.

If an acceptable design for optical source 314 is determined that satisfies all of the different constraints, inputs and other practical considerations (step 370) the design is completed (step 372). If not, the designer can select a different solution set at step 364, and possibly a different divergence angle at step 362 and repeat the optical source design. Once complete, equations 1-4 prescribe the design of the spherical lens 313, optical source 314 and positioning of the array of sources 314 on the focal sphere 316 such that the spherical lens collimates the divergent beams 314 into respective collimated beams 320 that each overlap the entire entrance pupil 308.

A representative solution space for an Aperture size A of 2.54 cm and a FOV of π/4 for equations 1-7 is depicted in Table 1 for EFL as a function of Radius R and index n, Table 2 for Beam Diameter d as a function of offset δ and Radius R and Tables 3a and 3b for optical source spacing for optical source design as function of Radius R and Index n. In Tables 3a and 3b the empty cells represent solutions that are not physically realizable because the source dimension is greater than the specified angular resolution and source spacing that would be required.

TABLE 1

| | | Effective Focal Length (EFL) in cm Index (n) | | | | |
|---|---|---|---|---|---|---|
| | | 1.43 | 1.50 | 1.52 | 1.54 | 1.72 |
| Radius (R) cm | 5.08 | 8.46 | 37.62 | 5.13 | 7.24 | 6.02 |
| | 10.16 | 16.89 | 15.24 | 14.86 | 14.48 | 12.04 |
| | 15.24 | 25.35 | 22.86 | 22.28 | 21.74 | 7.11 |
| | 20.23 | 13.30 | 12.00 | 11.69 | 11.41 | 18.06 |

TABLE 2

| | | Beam Diameter, d in cm | | | |
|---|---|---|---|---|---|
| | | Radius R in cm | | | |
| | | 5.08 | 10.16 | 15.24 | 20.23 |
| Offset, δ cm | 2.54 | 8.10 | 11.96 | 15.80 | 19.66 |
| | 3.81 | 9.07 | 12.93 | 16.76 | 20.62 |
| | 5.08 | 10.03 | 13.89 | 17.73 | 21.59 |
| | 6.35 | 11.00 | 14.83 | 18.69 | 22.55 |

TABLE 3a

Source Dimension of 0.95 cm

| | Resolution (rad/proj) = 0.12 # of sources = 13 | | | | | Resolution (rad/proj) = 0.06 # of sources = 26 | | | | |
|---|---|---|---|---|---|---|---|---|---|---|
| | Index, n | | | | | | | | | |
| Radius | 1.43 | 1.5 | 1.52 | 1.54 | 1.71 | 1.43 | 1.5 | 1.52 | 1.54 | 1.71 |
| 5.08 | | | | | | | | | | |
| 10.16 | 1.02 | | | | | | | | | |
| 15.24 | 1.52 | 1.37 | 1.35 | 1.32 | 1.09 | | | | | |
| 20.23 | 2.03 | 1.83 | 1.80 | 1.75 | 1.45 | 1.02 | | | | |

TABLE 3b

Source Dimension of 0.13 cm
Resolution (rad/proj) = 0.015
# of sources = 100

| | Index, n | | | | |
|---|---|---|---|---|---|
| Radius | 1.43 | 1.5 | 1.52 | 1.54 | 1.71 |
| 5.08 | | | | | |
| 10.16 | 0.127 | 0.127 | 0.127 | | |

TABLE 3b-continued

Source Dimension of 0.0051 cm
Resolution (rad/proj) = 0.0008
# of sources = 200

| | Index, n | | | | |
|---|---|---|---|---|---|
| Radius | 1.43 | 1.5 | 1.52 | 1.54 | 1.71 |
| 15.24 | 0.20 | 0.18 | 0.18 | 0.18 | 0.15 |
| 20.23 | 0.25 | 0.23 | 0.23 | 0.23 | 0.18 |
| 5.08 | | | | | |
| 10.16 | 0.08 | 0.05 | 0.05 | 0.05 | 0.05 |
| 15.24 | 0.10 | 0.10 | 0.08 | 0.08 | 0.08 |
| 20.23 | 0.127 | 0.127 | 0.127 | 0.10 | 0.10 |

To appreciate the impact of the spherical lens, consider the following representative example. For an aperture A of 2.54 cm, a FOV of π/4, an optical material of n=1.52 (i.e., crown glass, BK7), a spherical lens of radius 15.24 cm, SAL offset of δ=1.02 cm and an EFL of 22.35 cm, the maximum distance from a source to the entrance pupil is only 45.72 cm and the maximum distance between two sources at opposite sides of the FOV is only 11.68 cm. This provides a compact footprint for the test station that can be placed on a typical optical bench.

Depending on the FOV of the SAL Seeker and the required fidelity of the fixed angular positions of the sources on the focal sphere, the number of sources may be 100 to 1,000 or even higher. To be cost-effective, the per source cost must be low. This must be achieved without sacrificing angular fidelity and a test system footprint and geometry that is practical. We use SAL sources such as LEDs or VCSELs that have a large divergence angle. Initially it was thought that such sources could not be collimated in a manner that was cost-effective or physically practical; the sources would have to be placed at long distances from the sensor to appear in focus and not impact the calibration performance. These types of less-expensive sources are notorious for not having a repeatable divergence angle and can require highly sophisticated optics to collimate accurately. Furthermore, it was thought that the size of the optics required to overfill the entrance pupil would make the geometric construction of the array impossible, adjacent sources would either physically interfere with each other or would vignette the optical beam of the neighboring sources. We found that we could collimate all of the rapidly diverging beams with a single spherical lens in a compact footprint at low cost. Optical throughput could be sacrificed and still have sufficient power to project a spot of enough intensity onto the SAL detector.

Figure 6A:
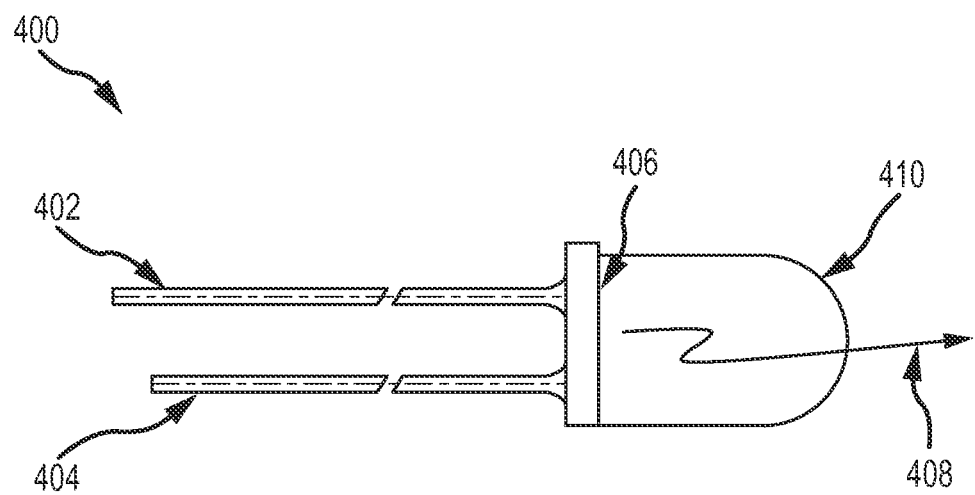
FIGS. 6a-6b are diagrams of an embodiment of a source comprising a Light Emitting Diode (LED)
Figure 6B:
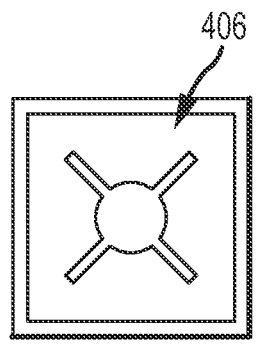

The throughput of the test system is largely determined by the dwell time of a given source needed to reliably detect a spot and the lag time to switch from activation of one source to activation of another source. The dwell time is a function of the number of pulses the sensor must detect to reliable detect a spot and the PRF of the source to deliver those pulses. Optical sensors such as the SAL detector can generally detect pulses over a certain pulse width range. Within that range the sensor may exhibit non-uniform noise properties. In lower noise regions of the pulse width range, the sensor detects incident pulses with a higher SNR and thus requires fewer received pulses to measure a spot position to the fidelity required for calibration. Both LEDs and VCSELs are capable of generating pulsed beams at very high PRFs, 10 kHz and higher. Furthermore, LEDs and VCSELS can be controlled via exterior electronics allowing for direct user control of the pulse width. The pulse width may be selected in a low noise region of the sensor. As a result, the dwell time at each source is at most approximately 100 ms, more typically approximately 1 ms and as low as approximately 0.1 ms. Because we are not slewing the sensor and do not have to wait for its response to settle, the lag time to switch is very short. The maximum time would be approximately 100 ms using a mechanical switch and a typical time would be approximately 100 micro seconds using electronic switching. In general, this time could be reduced even further until the point at which either the sensor under test is unable to resolve the separation of pulses, or the rise and fall time of the electronically activated sources limits pulse separation. The sensor under test can be designed to operate at a variety of different clock rates with a particular electronic bandpass, while typical LED and VCSEL rise and fall times are physically limited to approximately 10 ns, Referring now to FIGS. 6a-6b, an embodiment of an optical source comprises a Light Emitting Diode (LED) 400. The LED consists of an anode 402, a cathode 404 and a semiconductor p-n junction 406. When the diode is forward biased by application of a voltage, current flows from the anode 402 to the cathode 404, the charges carriers (electrons and holes) flow into the semiconductor p-n junction 406 (the active region) and combine. This lowers the energy level of the electron. The excess energy is released as a photon 408 through the transparent window 410.

The wavelength of the photon emitted by an LED depends on the band gap in the semiconductor. With proper selection of materials and/or doping concentration, the band gap can be engineered to produce photons anywhere from the near-UV to the near-IR, making it an excellent candidate for a calibration source for SAL systems. In addition, when the LED is properly activated, rise and fall times of approximately 10 ns are possible, allowing pulse widths from 20 ns to continuous wave. This functionality allows SAL calibration to be performed at a pulse width that minimizes the noise in amplitude estimation. A typical complaint of LED sources is that the divergence angle makes them difficult to collimate. However, if power levels are sufficient, a higher f/# optic can be used for collimation, making this a moot point. In addition, the large divergence provides a hidden advantage, by allowing a single optic to act as both a beam expander and collimator.

Figure 7A:
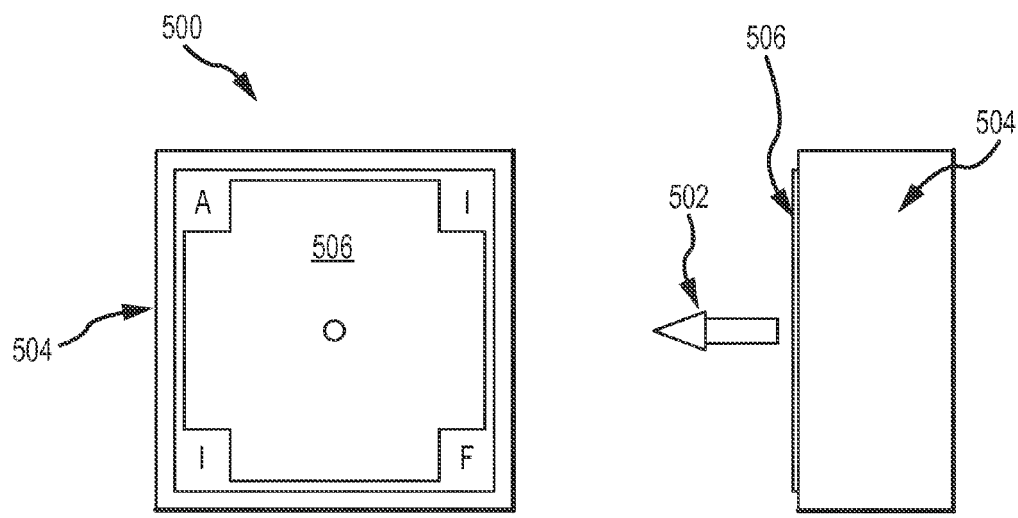
FIGS. 7a and 7b are diagrams of a VCSEL with bare die and chip on submount packaging options.
Figure 7B:
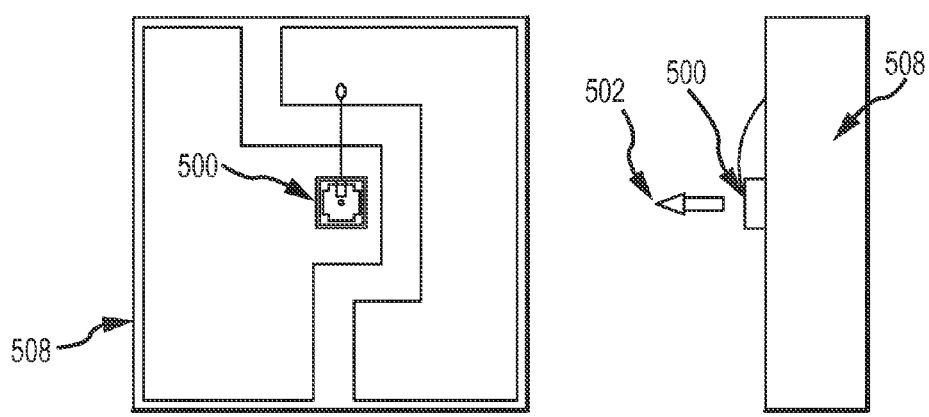

Referring now to FIGS. 7a-7b, an embodiment of an optical source comprises a Vertical Cavity Surface Emitting Laser (VCSEL) 500 in both a bare die and chip on submount packaging options. The VCSEL is a semiconductor laser diode with laser emission 502 orthogonal to the top surface. The component consists of quantum well region 504 (gain media) in addition to a p and n type semiconductor Bragg reflector region 506 that serves as the laser cavity. The component may be mounted as a chip on a submount 508. The wavelength of the photons emitted by a VCSEL is determined by the cavity geometry and gain media. With available manufacturing VCSEL wavelengths range from the visible to the short wave infrared, again making them particular useful for SAL calibration. While the divergence angle is smaller than a typical LED, it is still large enough to allow for a single optic to expand and collimate the source. However, due to the smaller divergence a VCSEL can provide a higher energy density. The VCSEL emission area is also smaller leading to a relaxation in the optic focal length requirement for a particular angular target size.

Ideally each optical source is a "point source" on the surface of the focal sphere. The closer the optical source is to a true point source, the more collimated the image projection. The area of a collimated projected point source image is determined by the numerical aperture of a spherical lens and the illumination source—the larger the angle of projection onto the spherical lens surface, the larger the output collimated beam.

Inexpensive off-the-shelf LED or VCSEL are not point sources. Point sources are more accurately created with an optical focusing system producing a virtual image by a lens system. This lens system may be provided by conventional discrete optical components or by a lenslet array. The more expensive or new technologies may provide optical sources that are close enough to a point source to not require an additional focusing system.

Figure 8:
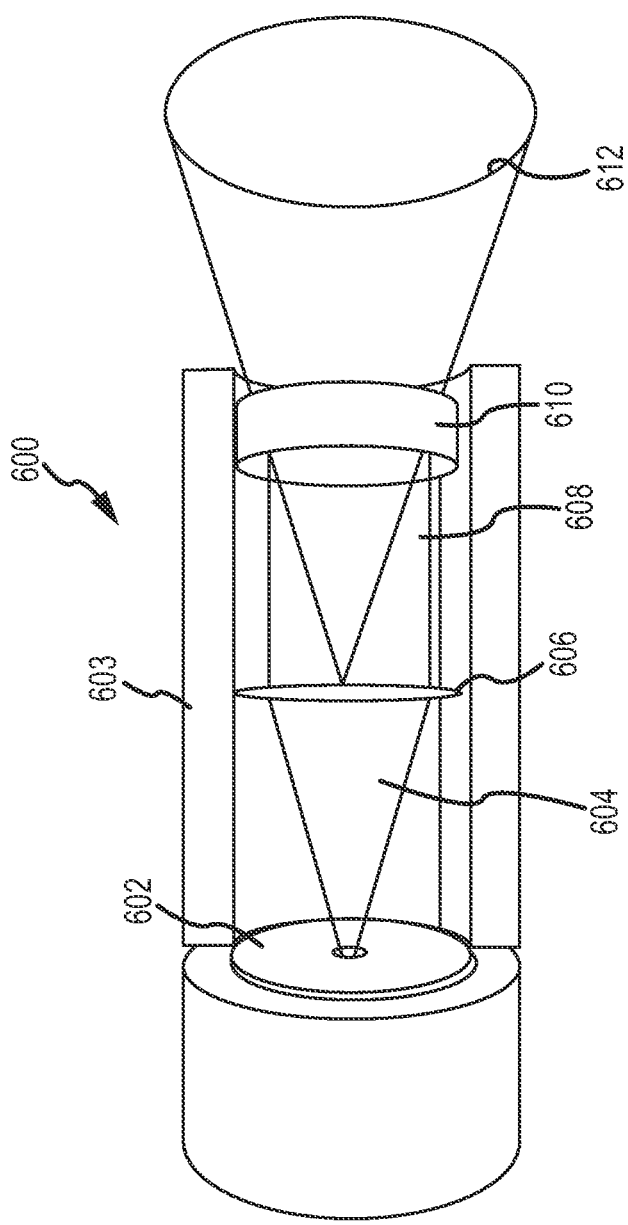
FIG. 8 is diagram of a point source projector for either the LED of VCSEL.

Referring now to FIG. 8, an embodiment of an optical source 600 includes a source 602 such as an LED or VCSEL in a housing 603 that emits a diverging beam 604. A single optical component such as a plano-convex lens 606 collimates the beam to form an internal collimated beam 608. A single optical component such as a negative lens 610 projects the internal collimated beam into a divergent beam 612 to approximate a point source. Other configurations of optical components can produce a point source projection from a non point source such as an Off-The-Shelf (OTS) LED or VCSEL.

Figure 9:
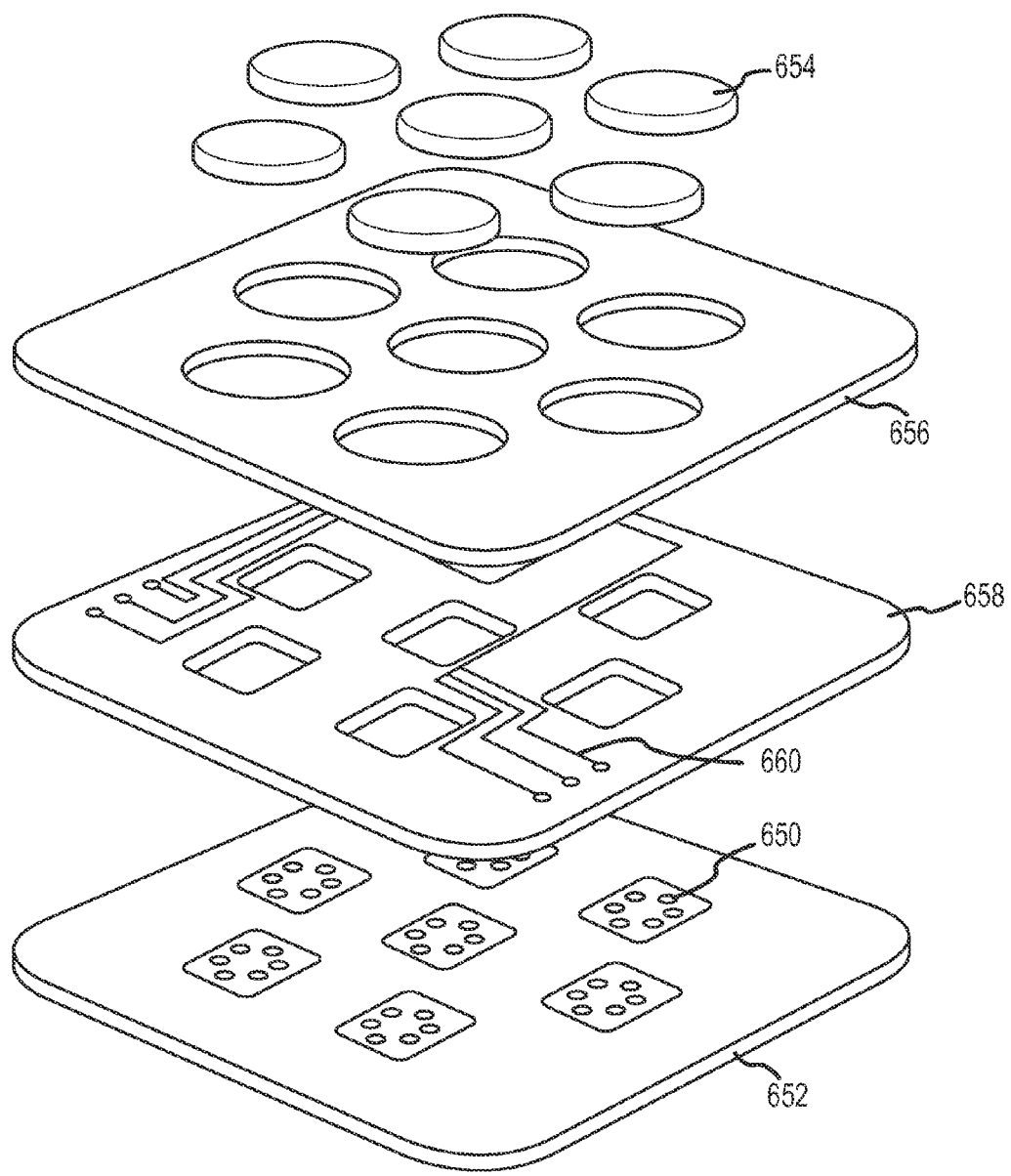
FIG. 9 is a diagram of an embodiment of a high-resolution fixed-source array using a lenslet array.

Referring now to FIG. 9, an embodiment of a high resolution array of optical sources includes an array of non-point optical sources 650 such as LEDs formed on a first substrate 652 conformal with the surface of the focal sphere and an array of lenslets 654 formed on a second substrate 656 aligned to the array of non-point optical sources and conformal with the surface of the focal sphere. An intermediate substrate 658 including electrical traces 660 for addressing optical sources 650 is suitably positioned between the source and lenslet arrays. The substrates are suitably formed of a compliant material to conform to the surface of the focal sphere. Each element in the array projects a beam with a specified divergence from an approximate point source. Integration of the lenslet array with an array of optical sources provides a much smaller per-source footprint, and the possibility for much higher angular resolutions to project video signals onto the detector.

Figure 10A:
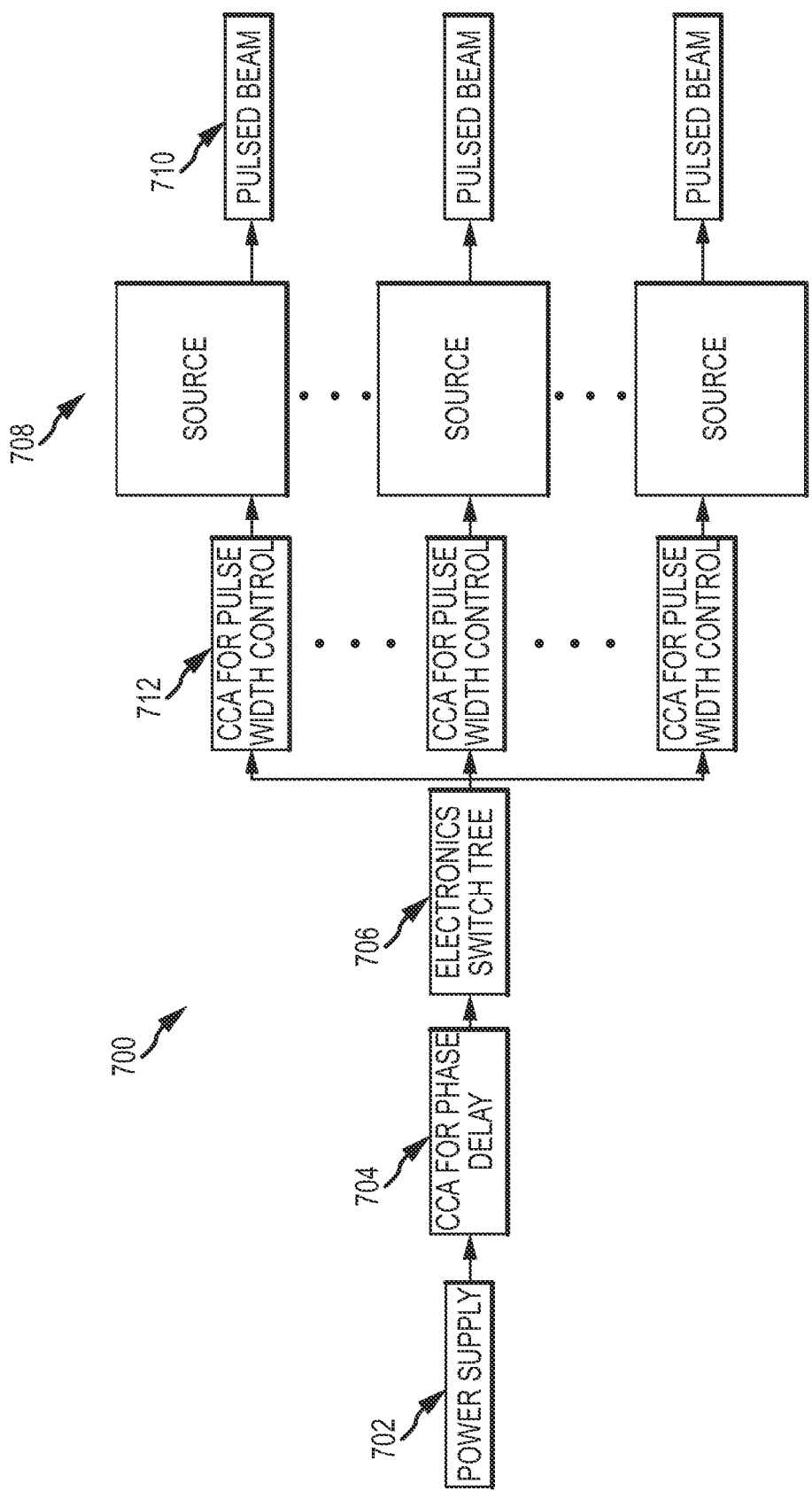
FIGS. 10a and 10b are electronics and opto-mechanical block diagrams for the fixed-source array.
Figure 10B:
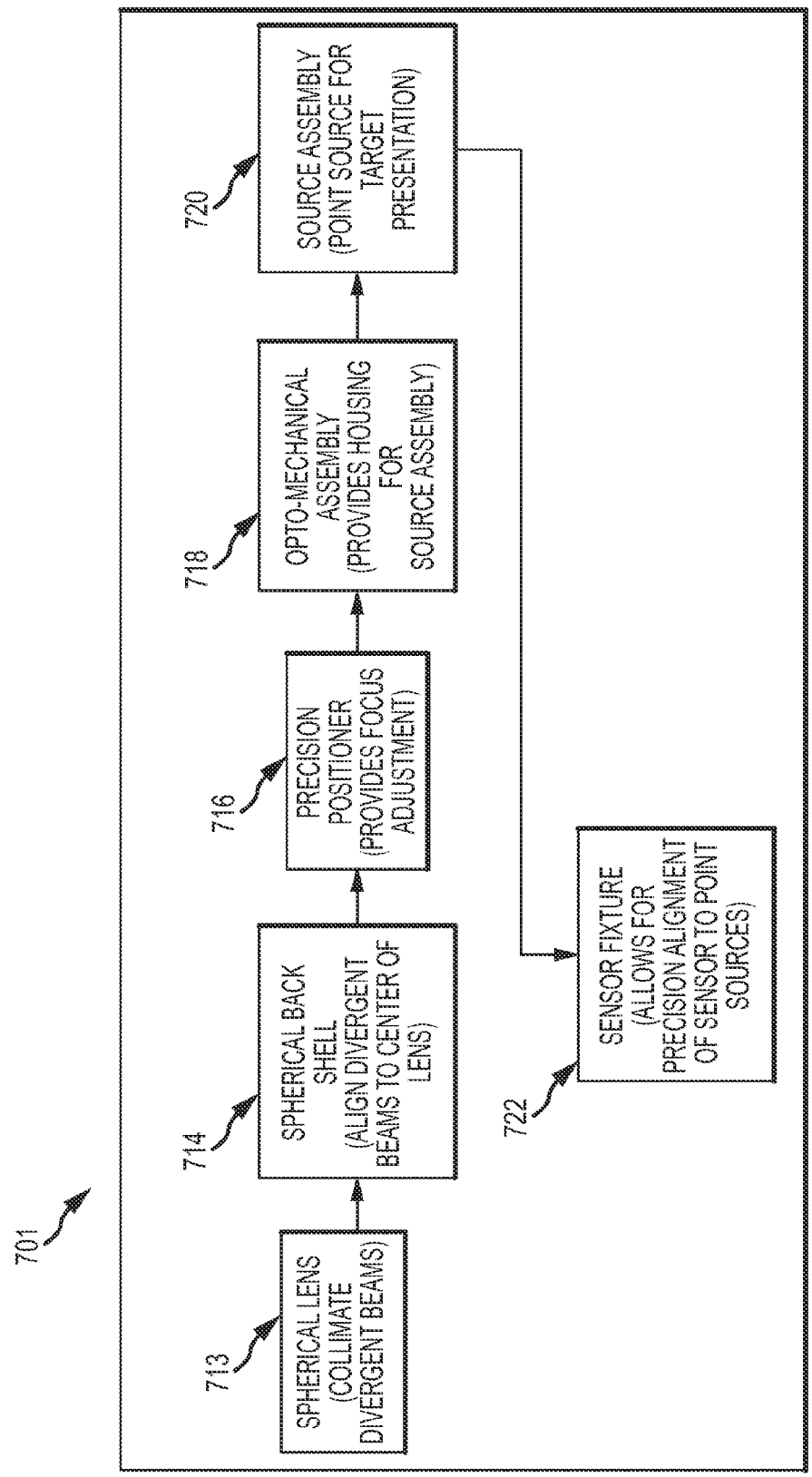

Referring now to FIGS. 10a and 10b, block diagrams for embodiments of the control electronics 700 for driving the fixed-source array and the opto-mechanical test bed 701 are illustrated. Control electronics 700 include a power supply 702 and a circuit card assembly (CCA) 704 that stores the activation pattern to activate the sources one at a time with minimum lag time to perform the STF calibration or simultaneously in a video signal to perform other tests. An electronics switch tree 706 sends control signals to activate the different sources 708 in accordance with the specified phase delays to generate pulsed beams 710 in sequence. Each source 708 is also provided with a CCA 712 that controls the pulse width of the beam and provides adequate termination to minimize reflections back to the switch tree.

Opto-mechanical test bed 701 includes a spherical lens 713 and a spherical back shell 714 that is a section of the focal sphere at the EFL of the spherical lens whose center of curvature coincides with the center of the spherical lens so that optical sources positioned on and orthogonal to back shell 714 are aligned along respective radial lines to the center of the spherical lens. Divergent optical beams from each optical source are collimated by the spherical lens to form collimated optical beams that overlap the entire entrance pupil of the seeker. This greatly simplifies alignment of the sources and reduces the footprint of the test system. A precision positioner 716 provides focus and tip/tilt adjustment for the LED or VCSEL source. An opto-mechanical assembly 718 holds the source and provides housing for the projection optics. An optical source assembly provides a stimulus or "target" at the fixed angular position for each source as a divergent beam from a point source. A sensor fixture 722 aligns the sensor (SAL seeker) to the fixed-source array. The sensor fixture may be static or provide some range of motion to correct for any alignment errors.

Figure 11:
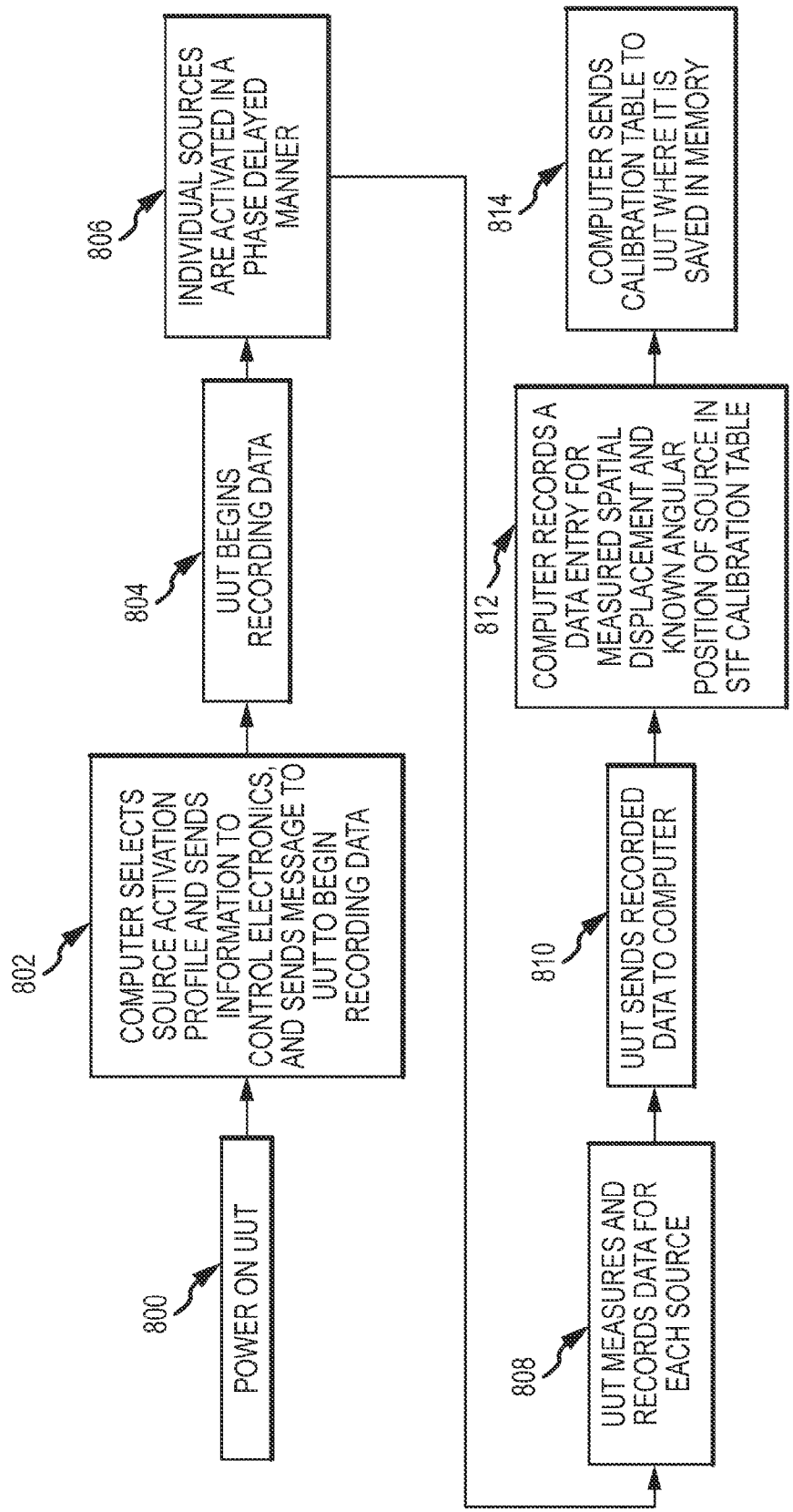
FIG. 11 is a flow diagram for the fixed-source array test station to calibrate a SAL seeker.

Referring now to FIG. 11, an embodiment of the procedure for calibrating the SAL seeker's STF using the fixed-source array test station is illustrated. The unit under test, or UUT (SAL Seeker), is powered on to active the SAL detector and any other ancillary systems (step 800). The computer selects the source activation profile for SAL Seeker STF calibration and sends the profile to the control electronics that loads the appropriate phase delay into the CCA, and sends a message to the UUT to begin recording data (i.e. spatial displacements $\Delta X$ and $\Delta Y$) (step 802). The UUT begins recording data (step 804) and the individual sources are activated in a phase delayed manner one at a time to implement the activation profile (step 806). The UUT measures and records the spatial displacement for each source (step 808) and sends the recorded data to the computer (step 810). The computer records a data entry for the measured spatial displacement and known angular position of the source (step 812). This is done for each source to develop an STF calibration table 900 for the UUT. The computer may perform an interpolation of the data to fill in missing entries or to provide regularly indexed entries. The computer then sends the calibration table to the UUT where it is saved in memory (step 814). Similar procedures are followed to activate the sources either one at a time or with a video signal to perform verification or characterization tests.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A test station for calibrating a semi-active laser (SAL) seeker including a SAL detector, comprising:

a fixture for mounting the SAL seeker, said seeker including an optical system having an entrance pupil that gathers optical energy over a field of view (FOV) and focuses the optical energy into a spot on the SAL detector;

a spherical lens having a first side positioned at a location in front of where the entrance pupil of the seeker would be located, said spherical lens comprising one or more materials each having an index of refraction greater than one and less than or approximately equal to two;

an array of fixed optical sources that generate respective temporally pulsed divergent optical beams, said sources positioned on a surface of a focal sphere at an effective focal length of the spherical lens offset from a second, opposite side of the spherical lens over the entire FOV of the seeker and aligned along respective radial lines to the center of the spherical lens so that each said divergent optical beam is collimated by the spherical lens to form a collimated optical beam that overlaps the entire entrance pupil of the seeker;

a memory that stores a first source activation profile to generate a transfer function for the SAL detector, said transfer function mapping a spatial displacement $\Delta X$ and $\Delta Y$ in orthogonal axes of a centroid of the spot to azimuth and elevation angles for the source of the spot;

a controller responsive to the first source activation profile to activate the sources one at a time in a phase delayed manner to implement the activation profile; and a computing device responsive to a measured spatial displacement ΔX and ΔY of the spot on the SAL detector for each source as the source is activated to create a table entry for the transfer function in a calibration table that maps the measured ΔX and ΔY to the known azimuth and elevation angles of the activated source.

2. The test station of claim 1, wherein the seeker's optical system is a non-imaging optical system and the SAL detector comprises a segmented non-imaging detector.

3. The test station of claim 1, wherein the seeker's optical system is an imaging optical system and the SAL detector comprises an imaging detector having an array of detector elements.

4. The test station of claim 1, wherein the spherical lens comprises only one unitary material having an index of refraction greater than one and less than or approximately equal to two.

5. The test station of claim 1, wherein the spherical lens comprises a plurality of different materials each having an index of refraction greater than one and less than or approximately equal to two that form a gradient index spherical lens.

6. The test station of claim 1, wherein the radius of the spherical lens is greater than or equal to 2.54 cm and less than or equal to 15.24 cm.

7. The test station of claim 1, wherein each optical source approximates a point source on the surface of the focal sphere.

8. The test station of claim 7, wherein each optical source comprises:
   a non-point optical source that emits an internal divergent beam;
   a collimator that collimates the divergent beam to form an internal collimated beam; and
   a negative lens that projects the internal collimated beam into the divergent beam to approximate the point source.

9. The test station of claim 7, wherein an array of optical sources comprises:
   an array of non-point optical sources formed on a first substrate conformal with the surface of the focal sphere, each said source emitting an internal divergent beam; and
   an array of lenslets formed on a second substrate aligned to array of non-point optical sources and conformal with the surface of the focal sphere, each said lenslet projecting the internal divergent beam into the divergent beam to approximate a point source.

10. The test station of claim 1, wherein a maximum distance between one of the sources and the entrance pupil is less than approximately 61 cm and a maximum distance between any two of the sources is approximately 15.25 cm.

11. The test station of claim 10, wherein the effective focal length is less than approximately 38 cm.

12. The test station of claim 10, wherein a distance between the first side of the spherical lens and the entrance pupil is less than approximately 5.8 cm.

13. The test station of claim 1, wherein spherical lens and position of the sources on the focal sphere are prescribed by the following set of equations:

$$\theta = \text{ArcTan}\left[\frac{2(n-1)\text{Cos}\left[\text{Tan}\left[\frac{FOV}{2}\right]\right]\left(\frac{A}{2} + (R+\delta)\text{Tan}\left[\frac{FOV}{2}\right]\right)}{nR}\right], d =$$

-continued $$2\text{Cos}\left[\text{Tan}\left[\frac{FOV}{2}\right]\right]\left(\frac{A}{2} + (R+\delta)\text{Tan}\left[\frac{FOV}{2}\right]\right)EFL =$$

$$\frac{n \times R}{2(n-1)}, \text{ and } NA = n\text{Sin}\theta = n\text{Sin}\left[\text{ArcTan}\left[\frac{d/2}{EFL}\right]\right]$$

where θ is the divergence of the divergent beam, R is the radius of the spherical lens, δ is the distance from the from side of the spherical lens to the entrance pupil, d is the width of the collimated beam, A is the aperture of the entrance pupil, EFL is the effective focal length and NA is the numerical aperture of the source.

14. The test station of claim 1, wherein, said memory stores a second activation profile to generate a video signal of a two-dimensional scene, said controller responsive to the second activation profile to simultaneously active multiple sources for each frame of the video signal to implement the second activation profile, said computing device responsive to data from said SAL detector to characterize the response of the SAL seeker to the scene.

15. A test station for a semi-active laser (SAL) seeker including a SAL detector, comprising:
   a fixture for mounting the SAL seeker, said seeker having an entrance pupil to detect optical energy over a field of view (FOV) and focus the optical energy into a spot on the SAL detector;
   a spherical lens having a first side positioned at a location in front of where the entrance pupil of the seeker would be located, said spherical lens comprising one or more materials each having an index of refraction greater than one and less than or approximately equal to two;
   an array of fixed optical sources that generate respective temporally pulsed divergent optical beams, said sources positioned on a surface of a focal sphere at an effective focal length of the spherical lens offset from a second, opposite side of the spherical lens over the entire FOV of the seeker and aligned along respective radial lines to the center of the spherical lens so that each said divergent optical beam is collimated by the spherical lens to form a collimated optical beam that overlaps the entire entrance pupil of the seeker;
   a memory that stores one or more source activation profiles to perform different tests;
   a controller responsive to one of the source activation profiles to activate the sources to implement the activation profile; and
   a computer that selects the source activation profile for a particular test, retrieves it from memory and provides it to the controller and is responsive to recorded SAL detector data to perform the test.

16. The test station of claim 15, wherein a maximum distance between one of the sources and the entrance pupil is less than approximately 61 cm and a maximum distance between any two of the sources is approximately 15.25 cm.

17. The test station of claim 15, wherein spherical lens and position of the sources on the focal sphere are prescribed by the following set of equations:

$$\theta = \text{ArcTan}\left[\frac{2(n-1)\text{Cos}\left[\text{Tan}\left[\frac{FOV}{2}\right]\right]\left(\frac{A}{2} + (R+\delta)\text{Tan}\left[\frac{FOV}{2}\right]\right)}{nR}\right], d =$$

-continued $$2\text{Cos}\left[\text{Tan}\left[\frac{FOV}{2}\right]\right]\left(\frac{A}{2} + (R+\delta)\text{Tan}\left[\frac{FOV}{2}\right]\right), EFL = \frac{n \times R}{2(n-1)}, \text{ and } NA = n\text{Sin}\theta = n\text{Sin}\left[\text{ArcTan}\left[\frac{d/2}{EFL}\right]\right]$$

where θ is the divergence of the divergent beam, R is the radius of the spherical lens, δ is the distance from the from side of the spherical lens to the entrance pupil, d is the width of the collimated beam, A is the aperture of the entrance pupil, EFL is the effective focal length and NA is the numerical aperture of the source.

18. A test station for an electro optic (EO) sensor, comprising:
- a fixture for mounting the EO sensor, said sensor having an entrance pupil to detect optical energy over a field of view (FOV) and focus the optical energy onto an EO detector;
- a spherical lens having a first side positioned at a location in front of where the entrance pupil of the sensor would be located, said spherical lens comprising one or more materials each having an index of refraction greater than one and less than or approximately equal to two;
- an array of fixed optical sources that generate respective temporally pulsed divergent optical beams, said sources positioned on a surface of a focal sphere at an effective focal length of the spherical lens offset from a second, opposite side of the spherical lens over the entire FOV of the sensor and aligned along respective radial lines to the center of the spherical lens so that each said divergent optical beam is collimated by the spherical lens to form a collimated optical beam that overlaps the entire entrance pupil of the sensor;
- a memory that stores one or more source activation profiles to perform different tests;
- a controller responsive to one of the source activation profiles to activate the sources to implement the activation profile; and
- a computer that selects the source activation profile for a particular test, retrieves it from memory and provides it to the controller and is responsive to recorded EO detector data to perform the test.

19. The test station of claim 18, wherein a maximum distance between one of the sources and the entrance pupil is less than approximately 61 cm and a maximum distance between any two of the sources is approximately 15.25 cm.

20. The test station of claim 18, wherein spherical lens and position of the sources on the focal sphere are prescribed by the following set of equations:

$$\theta = \text{ArcTan}\left[\frac{2(n-1)\text{Cos}\left[\text{Tan}\left[\frac{FOV}{2}\right]\right]\left(\frac{A}{2} + (R+\delta)\text{Tan}\left[\frac{FOV}{2}\right]\right)}{nR}\right], d =$$

$$2\text{Cos}\left[\text{Tan}\left[\frac{FOV}{2}\right]\right]\left(\frac{A}{2} + (R+\delta)\text{Tan}\left[\frac{FOV}{2}\right]\right), EFL = \frac{n \times R}{2(n-1)}, \text{ and } NA = n\text{Sin}\theta = n\text{Sin}\left[\text{ArcTan}\left[\frac{d/2}{EFL}\right]\right]$$

where θ is the divergence of the divergent beam, R is the radius of the spherical lens, δ is the distance from the from side of the spherical lens to the entrance pupil, d is the width of the collimated beam, A is the aperture of the entrance pupil, EFL is the effective focal length and NA is the numerical aperture of the source.

* * * * *